Sept. 23, 1958    W. F. TRAUGOTT    2,853,327
IDLER ARM BRACKET BEARING
Filed March 12, 1958    2 Sheets-Sheet 1
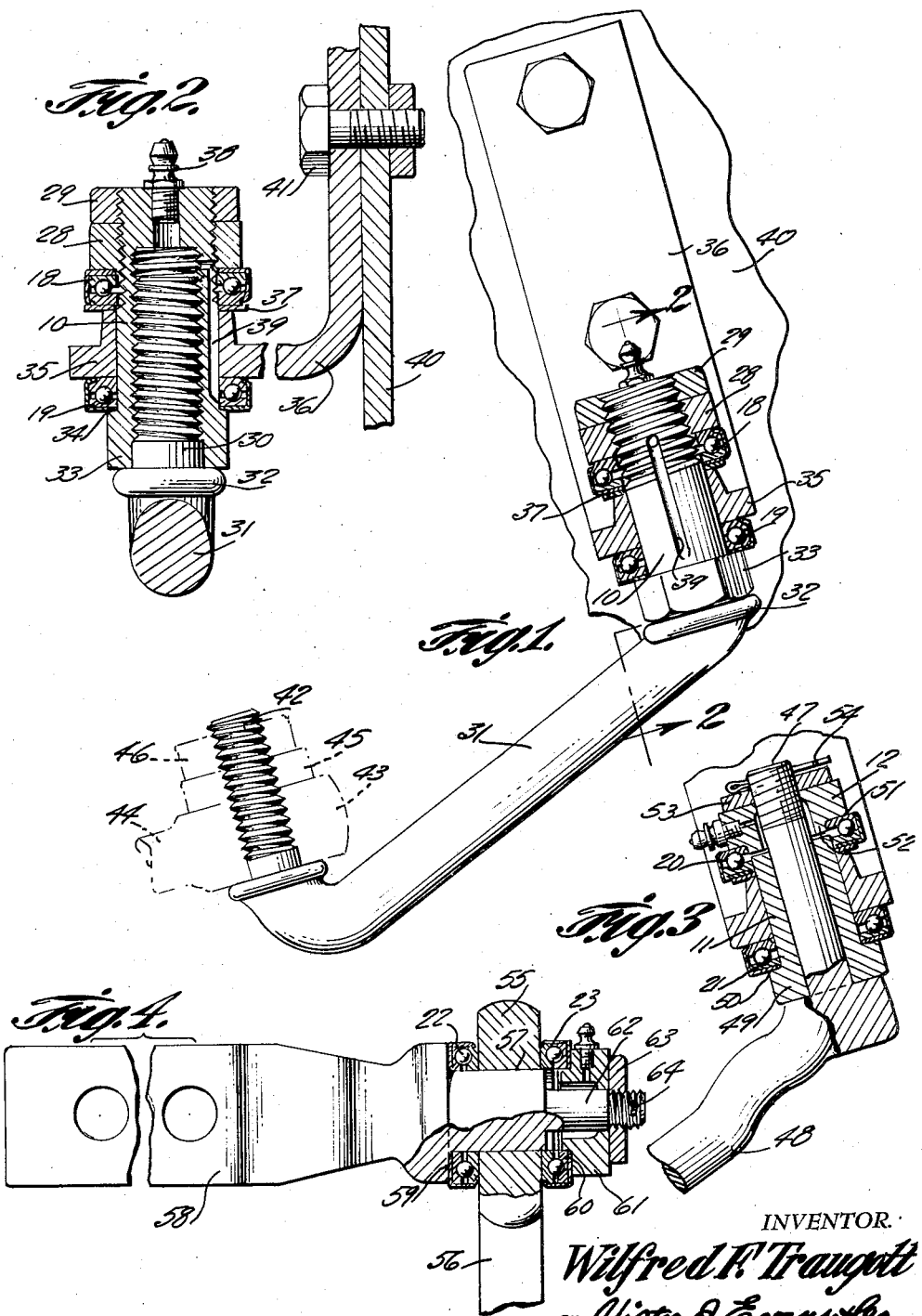
INVENTOR.
Wilfred F. Traugott
BY Victor J. Evans & Co.
ATTORNEYS

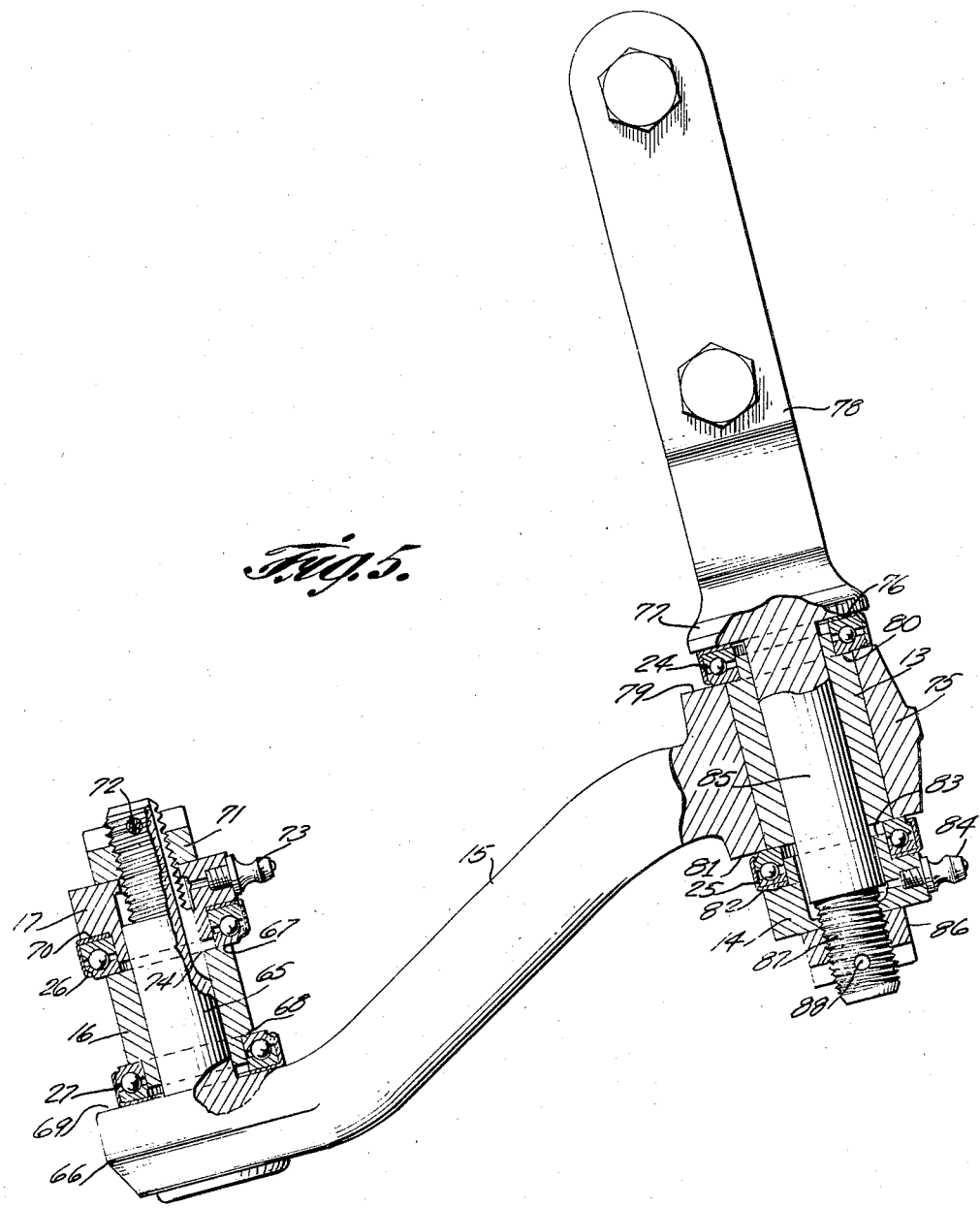

United States Patent Office 2,853,327
Patented Sept. 23, 1958

2,853,327

IDLER ARM BRACKET BEARING

Wilfred F. Traugott, West Point, Va.

Application March 12, 1958, Serial No. 720,950

5 Claims. (Cl. 287—93)

This invention relates to bearing assemblies for connecting idler arms of steering gear of motor vehicles to frame brackets and drag links, and in particular various types of bearing assemblies for use on motor vehicles of different manufacturers and in which ball bearings are positioned at opposite ends of hubs of frame brackets and drag links providing two point bearing constructions and providing assemblies that may be used on conventional manufacturers parts and that are readily adjustable to compensate for wear developing in the parts.

The purpose of this invention is to provide means for definitely eliminating play in the steering gear of motor vehicles and also means that is designed to be applied to manufacturer's standard parts so that complete new equipment is not required.

This application is a continuation in part of my co-pending application with the Serial Number 507,662, now abandoned, the invention being illustrated in Figures 1 and 2 of this and the co-pending application and variations thereof, to accommodate idler arm assemblies of different motor vehicle manufacturers being illustrated in Figures 3, 4, and 5.

The invention includes, primarily, a continuous sleeve extended through a hub of a frame bracket or drag link with bearings at both ends of the hub of the frame bracket or drag link and a plurality of sleeves, or a sleeve made in sections or used in combination with collars and with shoulders on the collars or sleeves providing locating seats for ball thrust bearings and also adjusting nuts on threaded studs at the ends of spindles extended from ends of the idler arm.

The object of this invention is, therefore, to provide an idler arm bearing assembly that provides two spaced points of support and that is adjustable throughout the life of the bearings positioned at the two points of support.

Another object of the invention is to provide an idler arm bearing assembly having bearings at spaced points of support in which the assembly is designed to be installed on manufacturer's standard parts so that new idler arms, frame brackets, and drag links are not required.

Another important object of the invention is to provide an improved bearing assembly for connecting idler arms to frame brackets and drag links in which the parts are adjustable to compensate for wear developing in the assembly.

A further object of the invention is to provide an improved idler arm bearing assembly in which the steering geometry of the steering gear of a vehicle is maintained at manufacturers levels.

A still further object of the invention is to provide an improved idler arm bearing assembly that uses manufacturer's standard parts and that provides two points of support in which the assemblies are of simple and economical construction.

With these and other objects and advantages in view the invention embodies a combination of an idler arm, frame brackets and drag links wherein the parts are connected with ball thrust bearings seated against shoulders of sleeves and parts of sleeves positioned on spindles extended through hubs of the parts and in which the parts are retained in assembled relation by nuts threaded on ends of spindles whereby adjustment of the parts is provided indefinitely.

Other features and advantages of the invention will appear from the following description taken in connection with the drawings, wherein:

Figure 1 is a side elevational view illustrating a typical idler arm with a stud on one end extended into a drag link hub, which is shown in broken lines and with an elongated sleeve threaded on a spindle extended from the opposite end and showing ball bearings at opposite ends of a hub of a frame bracket with locking nuts threaded on the end of a sleeve on which the ball bearings and hub are positioned.

Figure 2 is a longitudinal section through the assembly shown in Figure 1 taken on line 2—2 thereof.

Figure 3 is a vertical section through the hub assembly shown in Figure 1 showing a modification wherein a sleeve having a smooth bore is divided into sections.

Figure 4 is a longitudinal section through the bearing assembly of a drag link or idler arm hub on a spindle of a mounting or frame bracket wherein bearings are provided at both sides of the hub of the idler arm or drag link and wherein shoulders for the ball bearing are established on the spindle and in a sleeve on the end of the spindle.

Figure 5 is a side elevational view showing an idler arm and frame bracket assembly and with the hub of the drag link omitted, ball thrust bearings being provided at opposite ends of the hub of the drag link and idler arm and in which the bearings are positioned on shoulders of sleeves on spindles extended through the hub.

Referring now to the drawings wherein like reference characters denote corresponding parts the improved idler arm bearing assembly of this invention includes an elongated sleeve 10, or sleeve means including a plurality of sections such as the sleeve 11 and the section or bushing 12 shown in Figure 3 or the sleeves 13 and 14 shown at one end of an idler arm 15, in Figure 5, or the sleeves 16 and 17 shown at the opposite end of the idler arm, shown in Figure 5, and a pair of bearings, such as the bearings 18 and 19 shown in Figures 1 and 2, the bearings 20 and 21 shown in Figure 3, the bearings 22 and 23, shown in Figure 4 or the bearings 24 and 25 at one end of the idler arm 15 in Figure 5, or the bearings 26 and 27, at the opposite end of the idler arm 15.

The predominating feature of this invention is a continuous sleeve, or a plurality of sleeves, or a spindle extended through a hub of one member with ball bearings on the sleeve or spindle positioned at opposite ends of a hub providing two points of support and, with play therein taken up by an adjusting nut 28, secured by a lock nut 29 insuring a rigid steering assembly throughout the life of the vehicle.

The characteristic element of this assembly is in the fact that the parts are applied to conventional parts made to manufacturer's standards without requiring changes in such parts.

In the design illustrated in Figures 1 and 2 the sleeve 10, which is threaded internally is threaded on a spindle or stud 30 of an idler arm 31, the stud extended from a collar 32 and the sleeve having an enlarged portion 33 providing a shoulder 34 against which the bearing 19 is seated and the sleeve extending through a hub 35 of a frame bracket 36 and the bearing 18 being positioned against the opposite side of the hub with a washer 37 positioned between the bearing and the end of the hub. The parts are retained in assembled relation by the adjusting nut 28 and the nut is secured in position by the lock nut 29. The sleeve 10 may be provided with a grease fitting, as indicated by the numeral 38 and the side of the sleeve may be provided with a groove 39 through which lubricant is supplied to the bearings. The frame bracket 36 is secured to the chassis 40 of the vehicle by a bolt 41. In this design the opposite end of the idler arm 31 is provided with a threaded stud 42 on which a hub 43 of a drag link 44 may be secured by an adjusting nut 45 and a lock nut 46.

In the design illustrated in Figure 3 the sleeve is provided in parts or sections and the sections are mounted on a stud 47 extended from an idler arm 48 and the section 11 is formed with a shoulder 49, similar to the shoulder 34 of the sleeve 10, shown in Figure 2 and the bearing 21 is positioned against a shoulder 50. The bearing 20 is positioned with one side on the end of the sleeve 11 and with the opposite side against a shoulder 51 of the section 12 of the sleeve and on a boss 52. The parts are retained in operative positions by a nut 53 and the nut is held on the end of a stud by a cotter pin 54.

The assembly illustrated in Figure 3 is similar to that shown in Figures 1 and 2 except that the section or bushing 12 of the sleeve is separated from the cylindrical mounting element or section 11, however, in both designs all bearings are positioned directly against ends of the hub of the frame bracket and parts of the sleeve extend continuously through the hub providing two points of support substantially eliminating twisting or play in the connection.

In the design illustrated in Figure 4 a hub 55 of an idler arm 56 is mounted on a spindle 57 of a frame bracket 58 with the ball bearing 22 positioned against a shoulder 59 and the ball bearing 23 is positioned against a shoulder 60 of a sleeve 61 which is retained in position upon a stud 62 by a nut 63 and a cotterpin 64. In this design the bearings 22 and 23 are positioned on opposite sides of the hub 55 thereby providing two points of support and preventing twisting of the idler arm 56 in the connection.

In the design illustrated in Figure 5 a spindle 65 extends from a hub 66 of the idler arm 15 and the bearings 26 and 27 are positioned against shoulders 67 and 68 of the section 16 of the sleeve with the opposite side of the bearing 27 clamped against the face 69 of the hub 66 and the opposite side of the bearing 26 retained against a shoulder 70 of the section 17 of the sleeve. In this design the parts are retained in assembled relation by a nut 71, such as a castle nut with a cotter pin 72 extended through one of the slots in the end of the nut. The section 17 of the sleeve is provided with a grease plug 73 and lubricant is supplied to the bearing assembly through a slot 74 in one side of the spindle.

The end of the idler arm 15 opposite to the end on which the spindle 65 is positioned is provided with a hub 75 in which the sleeve 13 is positioned and in this design the ball bearing 25 is positioned against the face 76 of a collar 77 of a frame bracket 78 with the opposite side clamped against the end 79 of the hub 75 and also against a shoulder 80 of the section 13 of the sleeve. The bearing 25 at the opposite end of the hub is positioned against a face 81 and also against a shoulder 82 of the section 14 of the sleeve. The sleeve 14 is also provided with a boss 83 upon which the bearing 25 is positioned, and the opposite end is provided with a grease fitting 84. In this design the sleeve, including the parts 13 and 14 is mounted on a spindle 85 extended from the frame bracket 78 and the parts are retained in assembled relation by a nut 86 threaded on a threaded stud 87 at the end of the spindle and retained in position by a cotter pin 88 extended through one of the slots of the nut.

In these different designs two ball bearings, one positioned at each end of a hub are mounted upon established shoulders of a sleeve or sections of a sleeve extended through a hub whereby the ball bearings are retained in alignment and whereby an arm extended from a spindle of an idler arm or frame bracket is retained in position by two points of support. By this means play developing in the connection is removed by an adjusting nut.

Each motor vehicle manufacturer uses an idler arm and a frame bracket of a different design and the designs illustrated in the drawings of this application fit manufacturer's original parts without changing the parts.

By this means permanent bearing shoulders are established providing two points of support and substantially eliminating wobble or lateral play in the bearing assemblies.

Furthermore, in these bearing assemblies adjusting means is provided so that play that may develop in the parts is readily taken up or eliminated.

The bearing assemblies are not only designed to be used on new vehicles but may also be used to cover parts that are badly worn creating new surfaces and providing means for retaining the parts in absolute alignment.

It will be understood that modifications, within the scope of the appended claims, may be made in the design and arrangement of the parts without departing from the spirit of the invention.

What is claimed is:

1. In an idler arm bracket bearing, the combination which comprises an elongated sleeve having an internally threaded bore extended inwardly from one end and a shoulder on the outer surface of the end into which the bore extends, an idler arm having a threaded stud extended from one end and said stud being threaded in the bore of the sleeve, a bracket having a hub with a bore therethrough and said hub being positioned on the sleeve, a nut threaded on the end of the sleeve opposite to the end on which the shoulder is positioned, a lock nut also threaded on the end of the sleeve opposite to the end on which the shoulder is positioned, a first ball bearing mounted on the sleeve and positioned between the nut and shoulder, and a second ball bearing also mounted on the sleeve and positioned between the nut and shoulder, the ball bearings being mounted to be positioned on opposite ends of a hub of an idler arm bracket with the sleeve extended through the hub whereby ball bearings are provided at both ends of the hub and both bearings are mounted on the same sleeve establishing a continuity of bearing surfaces and maintaining the steering geometry of the idler arm bracket bearing.

2. In an idler arm bracket bearing, the combination which comprises an elongated sleeve for use with conventional frame brackets and idler arms as manufactured, having an internally threaded bore extended inwardly from one end and a shoulder on the outer surface of the end into which the bore extends, an idler arm having a threaded stud extended from one end and said stud being threaded in the bore of the sleeve, a bracket having a hub with a bore therethrough and said hub being positioned on the sleeve, a nut threaded on the end of the sleeve opposite to the end on which the shoulder is positioned, a lock nut also threaded on the end of the sleeve opposite to the end on which the shoulder is positioned, a first ball bearing mounted on the sleeve and positioned between the nut and one end of the hub of the bracket, and a second ball bearing mounted on the sleeve and positioned between the end of the hub of the bracket opposite to the end against which the first ball bearing is positioned and said shoulder whereby ball bearings are provided at both ends of the hub of the idler arm bracket and both bearings are mounted on the same sleeve establishing a continuity of bearing surfaces and restoring the original steering geometry of the assembly, the nut threaded on the sleeve being retained in adjusted positions by the lock nut providing means for taking up wear in the mounting continuously.

3. In an idler arm bracket bearing, the combination which comprises an elongated sleeve having an internally threaded bore extended inwardly from one end and having a shoulder on the outer surface of the end from which the bore extends, the bore being formed to receive a threaded stud extended from one end of an idler arm and the sleeve being formed to be positioned in the bore of a hub of an idler arm bracket, ball bearings mounted on the sleeve and positioned to engage opposite ends of the hub of the idler arm bracket, one of said bearings being positioned between an end of the hub of the idler arm bracket and the shoulder on the end of the sleeve, and means securing the other of said ball bearings against the end of the hub opposite to the end against which the bearing positioned between the end of the hub and shoulder is positioned, the assembly providing ball bearings at both ends of the hub of the idler arm bracket whereby the steering geometry of the assembly is restored and the idler arm is supported at two spaced points.

4. In an idler arm bracket bearing, the combination which comprises an assembly including sleeve means having a bore therethrough and formed to receive a stud extended from one end of an idler arm and the sleeve means being formed to be positioned on the stud and in the bore of a hub of an idler arm bracket, the sleeve means having bearing retaining shoulders thereon, ball bearings mounted on the sleeve means and positioned to engage opposite ends of the hub of the idler arm bracket, one of said bearings being positioned between an end of the hub of the idler arm bracket and a shoulder of the sleeve means, means securing the other of said ball bearings against the end of the hub opposite to the end against which the bearing positioned between the end of the hub and shoulder is positioned, means for retaining the parts in assembled relation and the assembly on the stud of the idler arm, the assembly providing ball bearings at both ends of the hub of the idler arm bracket whereby the steering geometry of the assembly is restored and the idler arm is supported at two points.

5. In an idler arm bracket bearing, the combination which comprises an assembly including an idler arm having a stud extended from one end, an idler arm bracket having a hub for receiving the stud of the idler arm, a cylindrical mounting element having a bore extended therethrough for receiving the stud of the idler arm and having a bearing retaining shoulder on the outer surface and spaced from one end, the hub of the idler arm bracket having a bore extended therethrough for receiving the cylindrical mounting element, a bushing having a ball bearing retaining shoulder thereon on the stud and positioned at the end of the cylindrical mounting element, bearings on the cylindrical mounting element and bushing positioned to engage opposite ends of the hub of the bracket with the stud extended through the hub, one of said bearings being positioned between the hub of the idler arm bracket and bearing retaining shoulder of the cylindrical mounting element and another of the bearings being positioned between the opposite end of the hub and a shoulder of the bushing, and means for retaining the assembly in operative position on the stud of the idler arm.

No references cited.